United States Patent [19]

Boyland et al.

[11] 4,167,809
[45] Sep. 18, 1979

[54] HOT AIR ARBOR EXTRACTOR

[75] Inventors: Wilford B. Boyland, Lebanon; John T. Hankins, Martinsville, both of Ind.

[73] Assignee: General Motors Corporation, Detroit, Mich.

[21] Appl. No.: 850,280

[22] Filed: Nov. 10, 1977

[51] Int. Cl.² .................................................. B23P 19/00
[52] U.S. Cl. ........................................ 29/800; 29/426
[58] Field of Search .......... 29/800, 148.4 R, 148.4 C, 29/234, 426, 427, 447, 762, DIG. 35; 403/15, 28

[56] References Cited

U.S. PATENT DOCUMENTS

| 1,980,156 | 11/1934 | Emrick | 29/426 |
| 3,724,059 | 4/1973 | Celovsky | 29/800 |

Primary Examiner—Michael J. Keenan
Attorney, Agent, or Firm—J. C. Evans

[57] ABSTRACT

A bearing sleeve extractor assembly includes a movable workpiece support on a stand having an overhead circular spray head to receive a multi-surfaced elongated bearing sleeve connected to a support member and wherein the spray head includes a perforated inner wall and an insulated outer wall having a heated vapor chamber therebetween connected to a heat source for directing heated vapor into the spray head for distribution therefrom to produce even convection heating of the bearing sleeve continuously circumferentially therearound so as to produce a non-mechanical thermal release of the bearing sleeve from its support member.

4 Claims, 5 Drawing Figures

HOT AIR ARBOR EXTRACTOR

This invention relates to arbor extractors and more particularly to means for removing an arbor like support member from a bearing sleeve for a gas turbine engine.

Various proposals have been suggested to mount a bearing block or support with respect to a bearing sleeve component. For example, U.S. Pat. No. 3,473,444, issued Oct. 21, 1969, to Leffers discloses a piston assembly for refrigeration compressors including a bearing block that is mounted in a piston insert either by chilling the bearing block or heating a hollow piston with the insert therein and shrinking them on the bearing block. The use of gas rings, blow torches and the like are well known for use in heating an exterior sleeve member to cause it to expand with respect to an internal support from which the sleeve is to be removed. While such methods are suitable for some purposes, there are instances where the bearing sleeve element that is carried by the internally located support member has a configuration that is both thin walled and of substantial axial extent with multiple surfaces thereon that make it difficult to apply uniform heat on all parts of the bearing sleeve to produce a uniform expansion of its walls and a resultant clean separation of the bearing sleeve from its support. In such cases, separation can only be accomplished by use of a mechanical tool to force the sleeve bearing from its support. Such tools can undesirably mar operating surfaces on the sleeve.

Accordingly, an object of the present invention is to provide an improved hot air extractor for use in removing precisely machined gas turbine engine bearing sleeves from either process arbors or gas turbine engine shafts by the provision of means for supporting a joined bearing sleeve and bearing support member telescoped internally thereof the means including a specially configured heat spray head having an open center thereon for receiving the joined bearing sleeve and support member in alignment with a plurality of perforations in the spray head formed continuously circumferentially around the joined parts and wherein means are provided for directing a uniformly continuous flow of heated fluid throughout the full exposed planar extent of the supported bearing sleeve to cause it to be uniformly heated at all points thereof for radial thermal expansion and release from the support member.

Another object of the present invention is to provide an extractor of the preceding object wherein the joined parts are supported by a workpiece plate movably supported vertically below the spray head and wherein the support platform workpiece plate is configured to permit the support member to fall vertically from the workpiece without imposition of a direct mechanical force on the sleeve bearing to mar the outer surface configuration thereof.

Still another object of the present invention is to provide an improved gas turbine engine bearing sleeve extractor assembly for use with a bearing support member having axially spaced lands thereon that define a conically tapered bearing sleeve reference surface for supporting a bearing sleeve with an internal tapered surface shrunk fit on the axial spaced lands and wherein the joined bearing support member and bearing sleeve are supported on a vertically movable work stand at a point vertically below an open ended heat spray head having opposite ends thereon and including an internal wall with continuously formed patterns of perforations thereon in communication with a heated source of fluid; the assembled bearing support member and bearing sleeve being vertically movable through the open ends of the heat spray head and exposed to flow of heated fluid from the perforations to be uniformly heated at the outer surface of the bearing sleeve to cause it to expand radially from the support member, the movable support stand being configured to allow the bearing sleeve support member to fall vertically from the bearing sleeve to cause mechanical separation between the parts without imposition of a direct mechanical force on the sleeve bearing.

Further objects and advantages of the present invention will be apparent from the following description, reference being had to the accompanying drawings wherein a preferred embodiment of the present invention is clearly shown.

Figure 1:
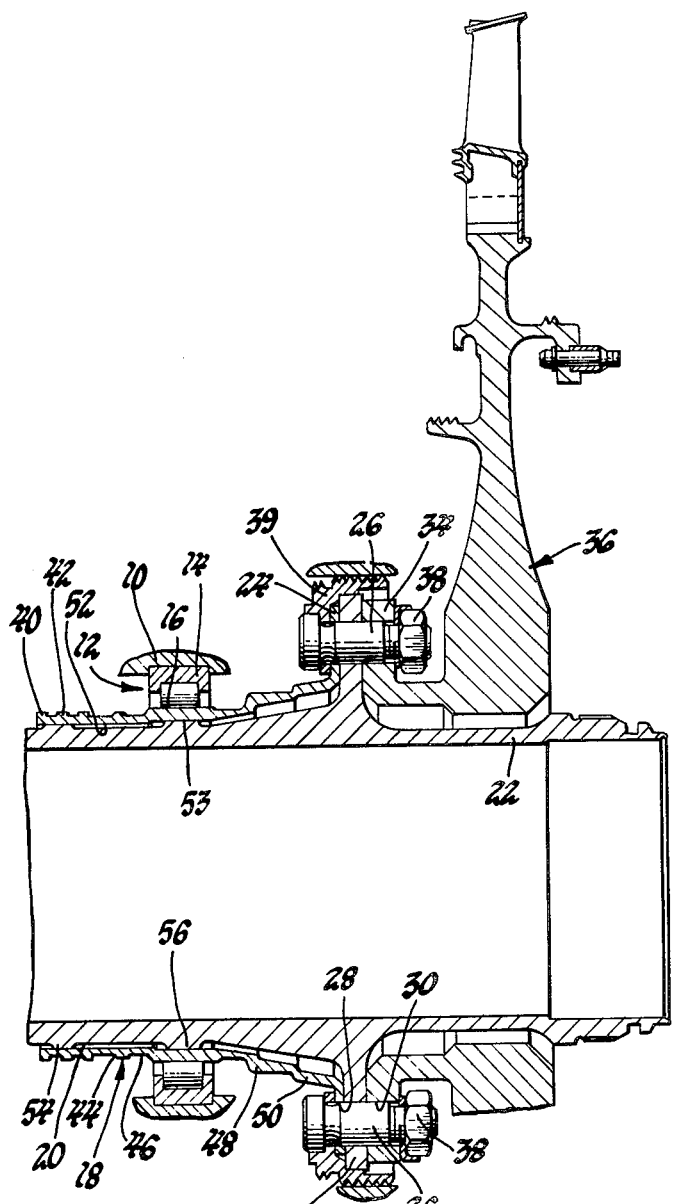
FIG. 1 is a fragmentary, longitudinal sectional view of a gas turbine engine rotor including an assembled bearing sleeve and turbine shaft for separation by use of the present invention.
Figure 2:
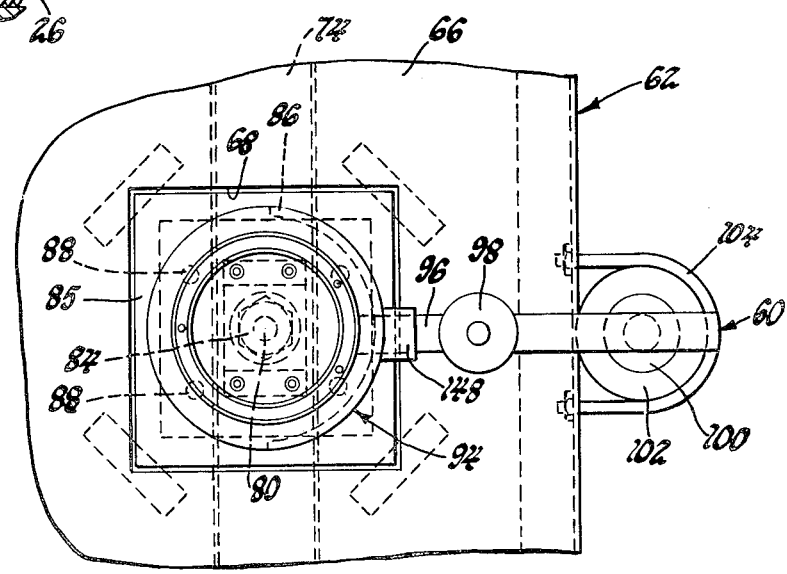
FIG. 2 is a fragmentary top elevational view of hot air arbor extractor of the present invention.

Referring now to the drawing in FIG. 1, a high pressure turbine bearing support and seal assembly for use in an axial flow gas turbine engine is illustrated including a high pressure turbine bearing support housing 10 with a roller bearing 12 having an outer annular race 14 supported therein. The inner race of the roller bearing assembly 12 is defined by closely machined axially peripheral surface 16 on a thin wall bearing sleeve member 18 that is shrunk fit on the outer periphery 20 of a high pressure turbine shaft 22. The bearing sleeve 18 includes a radially outwardly directed flange 24 thereon connected at circumferentially spaced points thereon by a plurality of screw fasteners 26 directed through connector openings 28 in the flange 24 and openings 30 in a seal support flange 32 and a radial flange 34 on rotor 36 on the high pressure turbine shaft 22. Nuts 38 secure the parts axially together and to a rotor seal 39.

The bearing sleeve member 18 more particularly includes a thin walled extension 40 on one end thereof having a plurality of seal lands 42 located in its outer periphery. A locating shoulder 44 is formed around the outer periphery immediately aft of the extension 40. The bearing sleeve member 18 also includes a thin neck segment 46 that joins the extension 40 to the axially extending peripheral surface 16 serving as the bearing race. The surface 16 of the sleeve member 18 is heat treated to be a case hardened raceway for the bearing. In one working embodiment, surface 16 has a Rockwell hardness at the case of 15N-89.5 minimum and core Rockwell hardness of C42-51. Immediately aft of the outer peripheral surface 16 the sleeve member 18 has a pair of radially outwardly directed offset axial segments 48, 50 which are joined to the sleeve flange 24. Sleeve member 18 further includes internal tapered surfaces 52, 53 that are supportingly received on axially spaced annular lands 54, 56, respectively, on the high pressure turbine shaft 20. Lands 54, 56 serve as a reference for locating the bearing sleeve in place.

Figure 3:
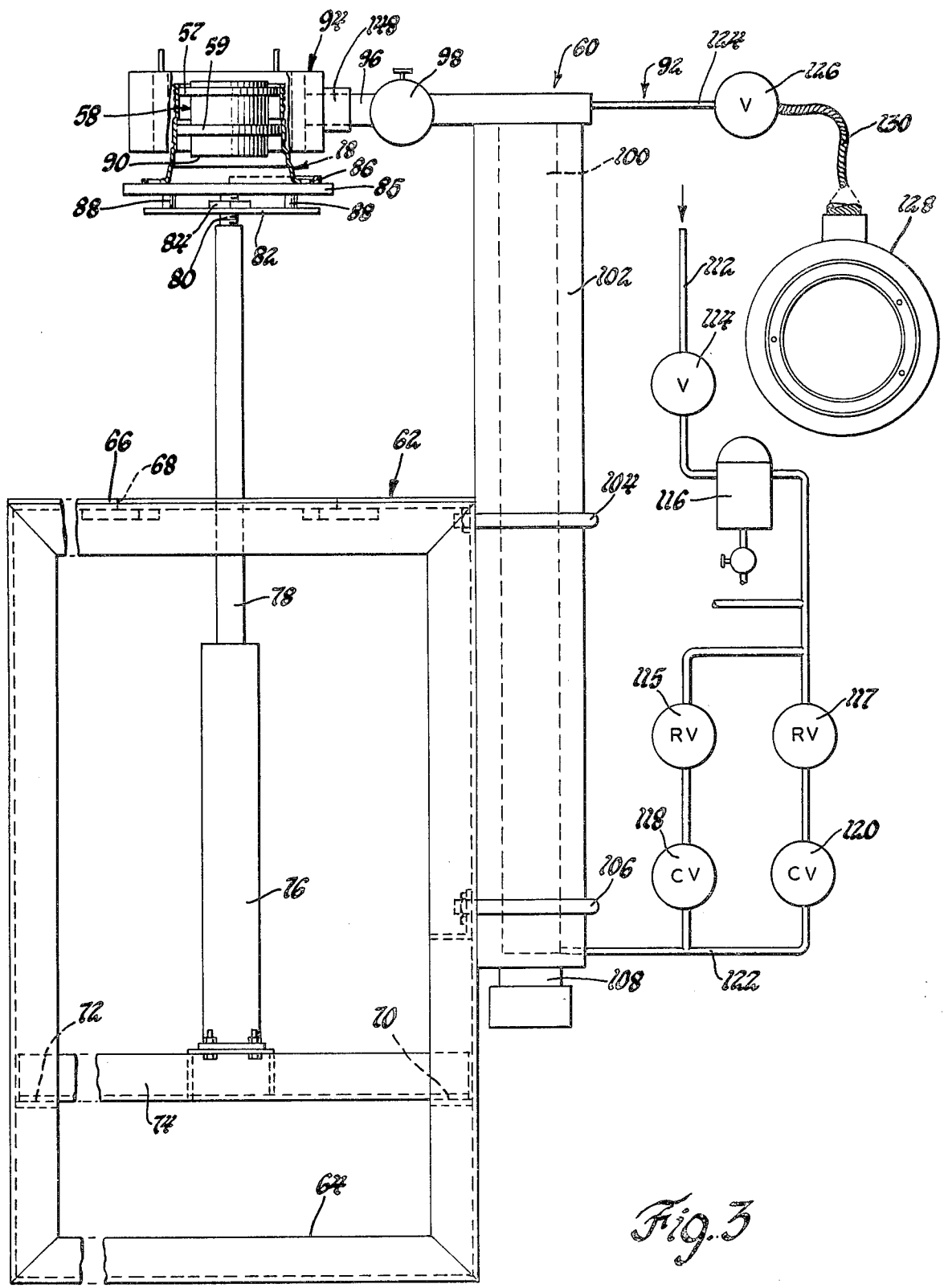
FIG. 3 is a side elevational view of the hot air arbor extractor of the present invention showing a joined arbor and bearing sleeve in a first operative position with respect to a heat spray head thereon.

Referring now to FIG. 3, the sleeve member 18 of FIG. 1 is shown connected to a workpiece arbor 58 that is used to locate the forged sleeve member 18 with respect to tools for final grinding of surfaces such as the axially directed peripheral surface 16 thereon prior to final heat treatment. It includes land surfaces 57, 59 thereon corresponding to lands 54, 56 and serving the same purpose.

In order to readily separate such a thin wall bearing sleeve member 18 from the arbor 58 during manufacturing and/or from the shaft 22 for maintenance, previously it has been necessary to apply mechanical force to such parts. It has been found, however, that application of such mechanical forces on such parts and/or uneven heating of the complex outer wall configuration can result in damage to the bearing sleeve which can cause rejection by a buyer or can cause part rework at considerable expense before being suitable.

Accordingly, the present invention includes a hot air extractor assembly 60 shown in FIG. 3 as including a welded frame 62 having a support base 64 including a top plate 66 having a square opening 68 formed therein. The welded frame 62 includes angle arm braces 70, 72 at either side thereof connected to a cross channel 74 that supportingly receives an air cylinder 76 having a reciprocating piston 78 extending therefrom. A threaded end 80 of the piston 78 is connected to a movable plate 82 by means of a fastener nut 84. A semi-circular bar 86 is welded to the upper surface of an upper support plate 85 to serve as a locating stop for a workpiece to be carried by the plate 85. Diametrically located spacers 88 are also fastened to the plate 82 to supportingly receive the upper plate 85 which is spaced from bottom 90 of the arbor 58 in vertically spaced relationship as shown in the prerelease position of FIG. 3.

An air heater system 92 is associated with the hot air extractor assembly 60 to supply a heat spray head 94 that is located vertically above the support plate 85 in coaxial alignment therewith. More particularly, the heat spray head 94 is connected by means of a supply pipe 96 under the control of a hand operated valve 98 to a large volume supply reservoir 100 having a layer of insulation 102 formed continuously through the vertical extent thereof. The pipe 100 and insulation 102 are connected to the support base 64 by means of U-clamps 104, 106. A screw in heater 108 is directed vertically into the pipe 100. In one working embodiment the heater was in the form of a Chromalox heater with a rating of 8 KW at 460 volts.

Figure 4:
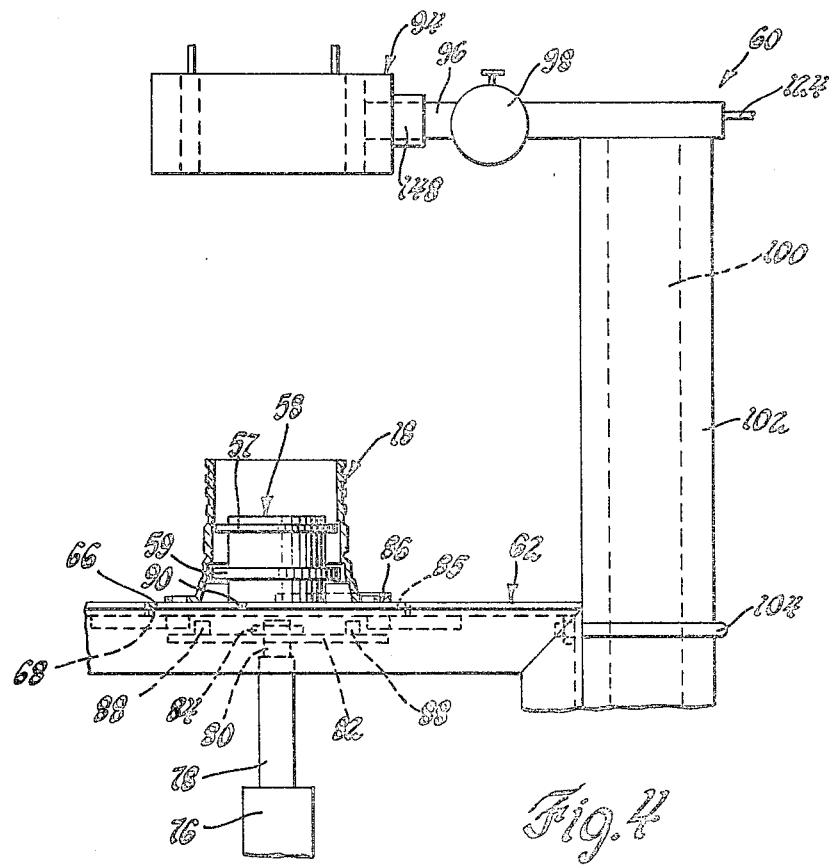
FIG. 4 is a fragmentary side elevational view of the extractor of FIG. 3 showing a workpiece support plate in a retracted position and the joined parts released.

Air from a compressed air supply pipe 112 is directed through a shut-off valve 114, thence through a dryer assembly 116 and through pressure relief valve components 115, 117 in parallel with one another and through either a low volume control valve 118 or high volume control valve 120 to a supply pipe 122 that communicates with the interior of the heater pipe 100. Additionally, the illustrated system includes a branch outlet pipe 124 from the heater pipe 100 connected by means of a manually operated valve 126 to an auxiliary heat coil 128 that is configured like the heat spray head 94. It is connected by a flexible conduit 130 so that the auxiliary heat coil 128 can be located in surrounding relationship with a bearing sleeve on an existing shaft assembly for removal therefrom by a process to be discussed with reference to the hot air arbor extractor illustrated in FIGS. 3–5.

Figure 5:
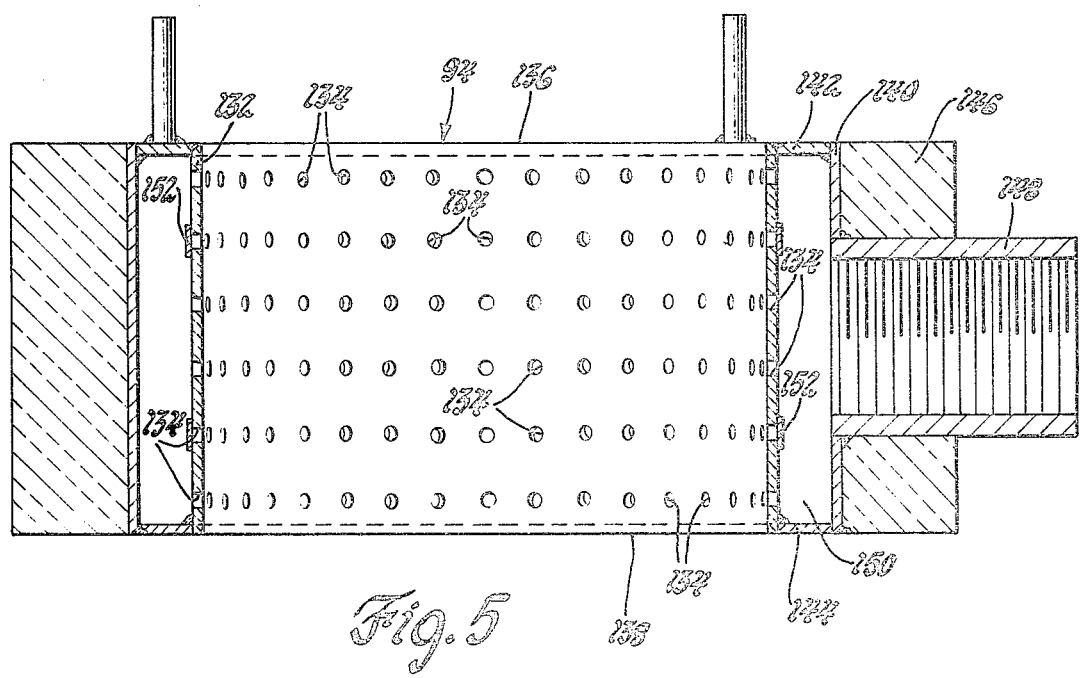
FIG. 5 is an enlarged fragmentary, vertical sectional view of the heat spray head of the present invention.

The heat spray head 94 is more particularly illustrated in FIG. 5. It includes an internal open ended wall 132 having a plurality of perforations 134 formed as a pattern completely circumferentially therearound and completely vertically between the upper open end 136 and the lower open and 138 thereof. The inner wall 132 is connected to an outer imperforate wall 140 having opposite open ends thereon joined by connector rings 142, 144 to the open ends 136, 138, respectively, of the inner wall 132. A layer of thermal insulation 146 is wrapped around the outer imperforate wall 140 and heat is supplied thereto by an inlet fitting 148 into an annular space 150 completely surrounding the inner wall 132 to act as a uniform pressure fluid source for passage of air through the perforations 134. Strap rings 152 on the outer surface of wall 132 can cover perforations 134 to control heat flow from the head 94.

The process of arbor extraction is shown more particularly in FIG. 3. First, the arbor 58 and bearing sleeve 18 are supported on the movable upper work support plate 85 which is then extended into the illustrated position in FIG. 3 so that the outer surface of the bearing sleeve 18 is surrounded by the heat spray head 94. The compressed air supply is opened to direct a predetermined desired amount of compressed air into the pipe 100 where it is heated by the heater 108 and thence directed into the space 150 to flow uniformly and evenly as a wash spray against the thin wall of the bearing sleeve 18 at points directly overlying the land surfaces 57, 59 defining a reference support surface of tapered configuration. The air is preferably maintained at the order of 700° F. so that it will quickly heat the material of the bearing sleeve without raising the temperature of the arbor 58 a commensurate amount. Consequently, thermal differential expansion will cause the arbor 58 to release and fall into the position shown in FIG. 4 where it is completely separated from the bearing sleeve 18. Separation is accomplished without the imposition of a direct mechanical force on the bearing sleeve 18 and as a result, the specially configured outer periphery of sleeve bearing 18 will be maintained in a pristine condition.

Likewise, when auxiliary ring 128 is fit over a sleeve 18 on a shaft 22 the heat wash will produce separation of the sleeve 18 in its pristine condition.

While the embodiments of the present invention, as herein disclosed, constitute a preferred form, it is to be understood that other forms might be adopted.

We claim:

1. A gas turbine engine bearing sleeve extractor assembly for use with a distal ended bearing support member having means thereon defining a tapered bearing sleeve reference surface to support a bearing sleeve having an inside surface shrunk fit on said reference surface comprising: a support stand having a workpiece plate mounted thereon, operator means for reciprocately supporting said workpiece plate on said stand for movement thereabove, a heat spray head located in spaced, overlying relationship to said support stand at a point in alignment with said workpiece plate, said heat spray head having a heat insulated outer wall and a continuously formed annular, open-ended perforated inner wall joined thereto to form a heated fluid space therebetween, means for directing heated fluid into said chamber for passage to said perforated inner wall interiorly of said heat spray head, said workpiece plate supportingly receiving the bearing sleeve to space the distal end of the support member in spaced relationship to said workpiece plate, said operator means positioning said bearing sleeve and said bearing support member into telescoped relationship within the perforated inner wall of said spray head, control means to regulate flow of heated fluid into said spray head to produce even convective heating of said bearing sleeve continuously circumferentially therearound and a resultant thermal expansion thereof to free the inside surface from the reference surface thereby causing release of the support member from said bearing sleeve without imposing a direct mechanical force on said sleeve bearing to mar the outer surface thereof.

2. A gas turbine engine bearing sleeve extractor assembly for use with distal ended bearing support member having means thereon defining a tapered bearing sleeve reference surface to support a bearing sleeve having an inside surface shrunk fit on said reference surface comprising: a support stand having a workpiece plate mounted thereon, operator means for reciprocately supporting said workpiece plate on said stand for movement thereabove, a heat spray head located in spaced, overlying relationship to said support stand at a point in alignment with said workpiece plate, said heat spray head having a heat insulated outer wall and a continuously formed annular, open-ended perforated inner wall joined thereto to form a heated fluid space therebetween, means for directing heated fluid into said chamber for passage to said perforated inner wall interiorly of said heat spray head, said workpiece plate supportingly receiving the bearing sleeve to space the distal end of the support member in spaced relationship to said workpiece plate, said operator means positioning said bearing sleeve and said bearing support member into telescoped relationship within the perforated inner wall of said spray head, control means to regulate flow of heated fluid into said spray head to produce even convective heating of said bearing sleeve continuously circumferentially therearound and a resultant thermal expansion thereof to free the inside surface from the reference surface thereby causing release of the support member from said bearing sleeve without imposing a direct mechanical force on said sleeve bearing to mar the outer surface thereof, said heater means including a branch conduit thereto, an auxiliary heat spray head having an insulated outer wall and a perforated inner wall defining an auxiliary heated fluid space connected to said branch conduit, said auxiliary heat spray head having open ends thereon to slide over the outer surface of the bearing sleeve to remove it from a support member located separate from the workpiece plate.

3. A gas turbine engine bearing sleeve extractor assembly for use with a distal ended bearing support member having axially spaced lands thereon defining a tapered bearing sleeve reference surface to support an externally stepped bearing sleeve having an internally tapered inside surface shrunk fit on said reference surface and a large diameter end comprising: a support stand having a workpiece plate mounted thereon, operator means for reciprocately supporting said workpiece plate on said stand for vertical movement thereabove, a heat spray head located in vertically spaced, overlying relationship to said support stand at a point in alignment with said workpiece plate, said heat spray head having a heat insulated outer wall and a continuously formed annular, open-ended perforated inner wall joined thereto to form a heated fluid space therebetween, heater means for directing heated fluid into said chamber for passage to said perforated inner wall interiorly of said heat spray head, said workpiece plate supportingly receiving the large diameter end on bearing sleeve to space the distal end of the support member in spaced relationship to said workpiece plate, said operator means positioning said bearing sleeve and said bearing support member into telescoped relationship within the perforated inner wall of said spray head, control means to regulate flow of heated fluid into said spray head to produce even convective heating of the bearing sleeve continuously circumferentially therearound and a resultant thermal expansion thereof to free the inside surface thereof from the spaced lands thereby causing release of the support member from said bearing sleeve without imposing a direct mechanical force on said sleeve bearing to mar the outer surface thereof.

4. A gas turbine engine bearing sleeve extractor assembly for use with a distal ended bearing support member having axially spaced lands thereon defining a tapered bearing sleeve reference surface to support an externally stepped bearing sleeve having an internally tapered inside surface shrunk fit on said reference surface and a large diameter end comprising: a support stand having a workpiece plate mounted thereon, operator means for reciprocately supporting said workpiece plate on said stand for vertical movement thereabove, a heat spray head located in vertically spaced, overlying relationship to said support stand at a point in alignment with said workpiece plate, said heat spray head having a heat insulated outer wall and a continuously formed annular open ended perforated inner wall joined thereto to form a heated fluid space therebetween, heater means for directing heated fluid into said chamber for passage to said perforated inner wall interiorly of said heat spray head, said workpiece plate supportingly receiving the large diameter end on bearing sleeve to space the distal end of the support member in spaced relationship to said workpiece plate, said operator means positioning said bearing sleeve and said bearing support member into telescoped relationship within the perforated inner wall of said spray head, control means to regulate flow of heated fluid into said spray head to produce even convective heating of the bearing sleeve continuously circumferentially therearound and a resultant thermal expansion thereof to free the inside surface thereof from the spaced lands thereby causing release of the support member from said bearing sleeve without imposing a direct mechanical force on said sleeve bearing to mar the outer surface thereof, said heater means including a branch conduit thereto, an auxiliary heat spray head having an insulated outer wall and a perforated inner wall defining an auxiliary heated fluid space connected to said branch conduit, said auxiliary heat spray head having open ends thereon to slide over the outer surface of the bearing sleeve to remove it from a support member located separate from the workpiece plate.

* * * * *